United States Patent [19]

Jones

[11] Patent Number: 5,283,938
[45] Date of Patent: Feb. 8, 1994

[54] METHOD OF MAKING A CONNECTING ROD FRACTURING TOOL

[75] Inventor: Joel Jones, Windsor, Canada

[73] Assignee: Tri-Way Machine Ltd., Ontario, Canada

[21] Appl. No.: 62,751

[22] Filed: May 18, 1993

[51] Int. Cl.$^5$ ............................................. B23P 17/00
[52] U.S. Cl. .................................... 29/416; 29/412; 29/434; 29/888.09; 51/281 R; 76/101.1
[58] Field of Search ............ 29/412, 416, 434, 888.09, 29/888.075; 76/101.1; 51/281 R, 289 R

[56] References Cited

U.S. PATENT DOCUMENTS

| | | |
|---|---|---|
| 2,553,935 | 5/1951 | Parks et al. . |
| 3,751,080 | 8/1973 | Bailey et al. . |
| 3,994,054 | 11/1976 | Cuddon-Fletcher et al. . |
| 4,569,109 | 2/1986 | Fetouh . |
| 4,768,694 | 9/1988 | Fabris et al. . |
| 4,970,783 | 11/1990 | Olaniran et al. . |
| 4,993,134 | 2/1991 | Hoag et al. . |
| 5,105,538 | 4/1992 | Hoag et al. .................... 29/888.09 |
| 5,169,046 | 12/1992 | Miessen et al. ................ 29/888.09 |

Primary Examiner—P. W. Echols
Assistant Examiner—David P. Bryant
Attorney, Agent, or Firm—Shoemaker and Mattare, Ltd.

[57] ABSTRACT

A fracturing tool for connecting rods has a first and second body prepared from material with a grain direction, each body having a semi-cylindrical protuberance with an axis substantially parallel with the grain of the material. The two protuberances together define a substantially cylindrical mandrel which can be placed within the large bore of a connecting rod which is to be cracked. The bodies are mounted so that one of them is slidable toward and away from the other in a direction perpendicular to the axis of the mandrel. The method of making the tool includes mounting the bodies on a rotary table having an axis of rotation coaxial with that of the mandrel. The rotary table rotates while a grinding wheel finish grinds the mandrel surface.

4 Claims, 5 Drawing Sheets

METHOD OF MAKING A CONNECTING ROD FRACTURING TOOL

This invention relates generally to a connecting rod fracturing tool and a method of making the tool.

BACKGROUND OF THIS INVENTION

Connecting rods for automobile engines have a large end with a separable cap for attachment to a crankshaft, and a small end typically with a cylindrical ring bearing assembly for connection to the piston utilizing a pin.

With the development of more powerful engines operating at higher rpm's, the connecting rods have been subjected to increased stress, calling for improvements in design.

Connecting rods were originally made by casting or forging separate attachable cap and body portions. The parts were separately machined at both joining and thrust faces, and then separately drilled with holes to accept fasteners.

An early step in the improvement of connecting rods was to cast the rod as a single piece, followed by drilling for fasteners. The single piece was then sawed to obtain cap and body portions which were separately rough-machined at the thrust and contacting surfaces. The two portions were then bolted together for finish-machining. Not only were these separate steps cumbersome and expensive, but also they did not ensure a perfectly matched cap and body under all conditions. In some cases, inherent diametrical fastener clearances permitted shifting between the cap and the body portion, which in turn shortened the bearing life.

The next step in this development was to forge a single-piece connecting rod which was subsequently split or cracked into a cap portion and a body portion, the intention being to provide non-sliding surfaces where the cap and the body portions are bolted together. The intention was that the surfaces would be properly remated, with the roughness of the cracked surface preventing any microshifting and thus assuring accurate operational alignment. To split the single piece into two portions, it was initially struck on one side with a sharp blow. However, this was unsuccessful because it was impossible to control the cracking plane and to prevent possible damage to the connecting rod.

An early attempt to solve this problem involved the insertion of a wedge-expandable mandrel into the large bore of the rod, as set forth in U.S. Pat. No. 2,553,935, issued to Parks et al in May, 1951. The idea was that the big end of the rod would fracture at the two weak sides of the yoke. The cracking was carried out at normal temperatures even though the rod was made of a strong, non-brittle, high carbon rough steel. Radial reductions at the intended cracking plane were provided by sawing, milling, drilling or a combination of these three. This reduced the crackable section and weakened the material to assist cracking. However, this approach did not ensure distortion-free cracked surfaces.

Another approach is set forth in U.S. Pat. No. 3,751,080 issued to John M. Bailey et al on Aug. 7, 1973. This patent recognizes the difficulty of fracturing strong high-carbon steels at room temperature when they were formed in large sizes. According to the patent, an electron beam is moved along a desired path in an undulating fashion which separates the rod to render a pair of rippled interfacing surfaces. It was found, however, that the electron beam imparted a deleterious effect to the material, in addition to being slow and costly.

Another approach is provided in U.S. Pat. No. 3,994,054, issued to Angus N. Cuddon-Fletcher et al on Nov. 30, 1976, in which tension forces are provided mechanically by conical pins forced into bolt holes at each side of the big end of the connecting rod. The bolt holes reduce the split plane section and the tapered pins provided a more equalized cracking impact. The technique, however, resulted in wear on the sides of the bolt openings and inhibited accurate remating.

Further approaches are provided in U.S. Pat. No. 4,569,109, issued to Mohamed A. Fetouh on Feb. 11, 1986, and U.S. Pat. No. 4,768,694, issued to Alroy G. Fabris on Sep. 6, 1988. This patents are directed to applying freezing or heat treatment to a rod composed of either cast iron, aluminum or steel. High impact tension forces are applied across a cracking plane defined by two notches in the internal surface of the large end bore while limiting relative movement to avoid ductile bending or incomplete fracture. It was found that embrittlement by freezing or heat treatment led to an indefiniteness in the direction of the crack, and as much as 25% of a production run had to be scrapped because of an improper placement of the final crack planes.

U.S. Pat. No. 4,970,783, issued to Olaniran et al on Nov. 20, 1990, is directed to a method of making a connecting rod which involves treating the intended cracking locations with hydrogen to facilitate hydrogen stress cracking.

A patent of more general interest is U.S. Pat. No. 4,993,134, issued to Hoag et al on Feb. 19, 1991.

GENERAL DESCRIPTION OF THIS INVENTION

The present invention is directed not to a process for manufacturing a connecting rod, but rather to a specially designed tool providing a split mandrel to bring about the cracking of the large end of a connecting rod, along with a method by which the tool is manufactured.

More particularly, this invention provides a method of making a fracturing tool for connecting rods, comprising the steps:

a) cutting a first body and a second body from material having a grain direction, each body having an integral, substantially semi-cylindrical protuberance projecting therefrom and constituting one-half of a substantially cylindrical mandrel, the protuberances each including a flat, diametral surface and being larger than the desired finished size, the cylindrical axis of each protuberance being substantially parallel with the grain of the material, the bodies being configured such that the protuberances can be placed together coaxially with said surfaces in contact to define said mandrel, b) mounting the bodies to a rotary table having an axis of rotation, such that the axis of the mandrel defined by the protuberances is coaxial with said axis of rotation, c) using a grinding means to finish grind the surface of the mandrel, while rotating said rotary table, d) removing the bodies from said rotary table, and mounting them such that one body is slidable toward and away from the other body in a direction perpendicular to the axis of the mandrel and perpendicular to both said surfaces, said one body being movable between a first position in which the protuberances are together and coaxial and a second position in which the protuberances are spaced apart, and e) providing means for forcefully urging the bodies together and apart.

Further, this invention provides a fracturing tool for connecting rods, comprising:

a first body and a second body prepared from material having a grain direction, a substantially semi-cylindrical protuberance projecting from each body and constituting one-half of a substantially cylindrical mandrel, each protuberance including a flat, diametral surface, the cylindrical axis of each protuberance being substantially parallel with the grain of the material, the bodies being configured such that the protuberances can be placed together coaxially with said surfaces in contact to define said mandrel, mounting means for said bodies, such that one body is slidable toward and away from the other body in a direction perpendicular to the axis of the mandrel and perpendicular to both said surfaces, said one body being movable between a first position in which the protuberances are together and coaxial and a second position in which the protuberances are spaced apart, and power means for forcefully urging the bodies together and apart.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
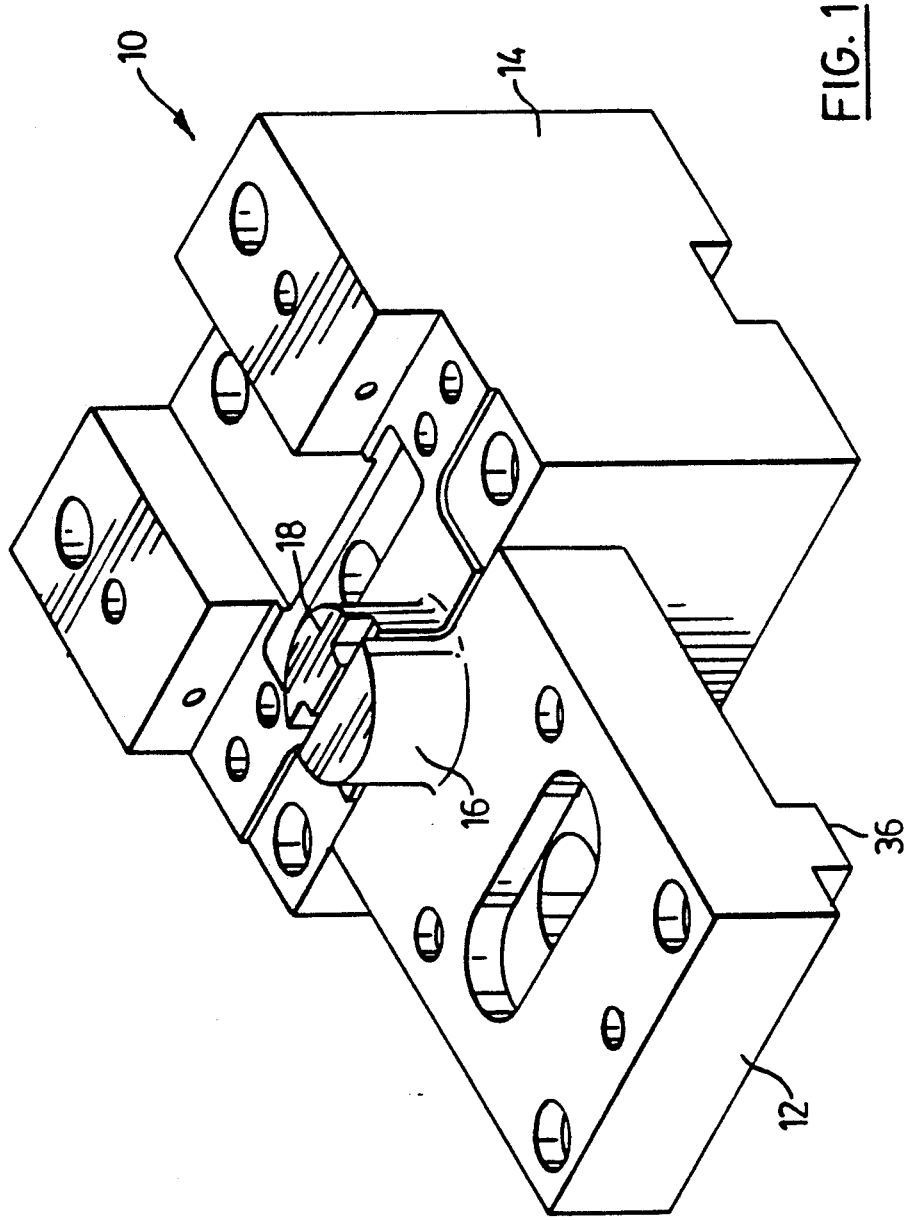
FIG. 1 is a perspective view of the connecting rod fracturing tool constructed in accordance with this invention.

Attention is first directed to FIG. 1, for a description of the primary parts of the connecting rod fracturing tool. A tool is shown generally at the numeral 10, and includes a first body 12 and a second body 14. Both bodies are cut from stock material having a particular grain direction, and more specifically are cut in such a way that the grain direction is vertical for both bodies shown in FIG. 1. Projecting upwardly from the first body 12 is a semi-cylindrical protuberance 16, and projecting upwardly from the body 14 is a further semi-cylindrical protuberance 18. Each semi-cylindrical protuberance constitutes one-half of a substantially cylindrical (composite) mandrel, when the two bodies 12 and 14 are placed in mating position as illustrated FIG. 1. More particularly, each protuberance 16, 18 includes a flat, diametral surface, the two diametral surfaces being in face-to-face contact in the FIG. 1 configuration.

Figure 2:
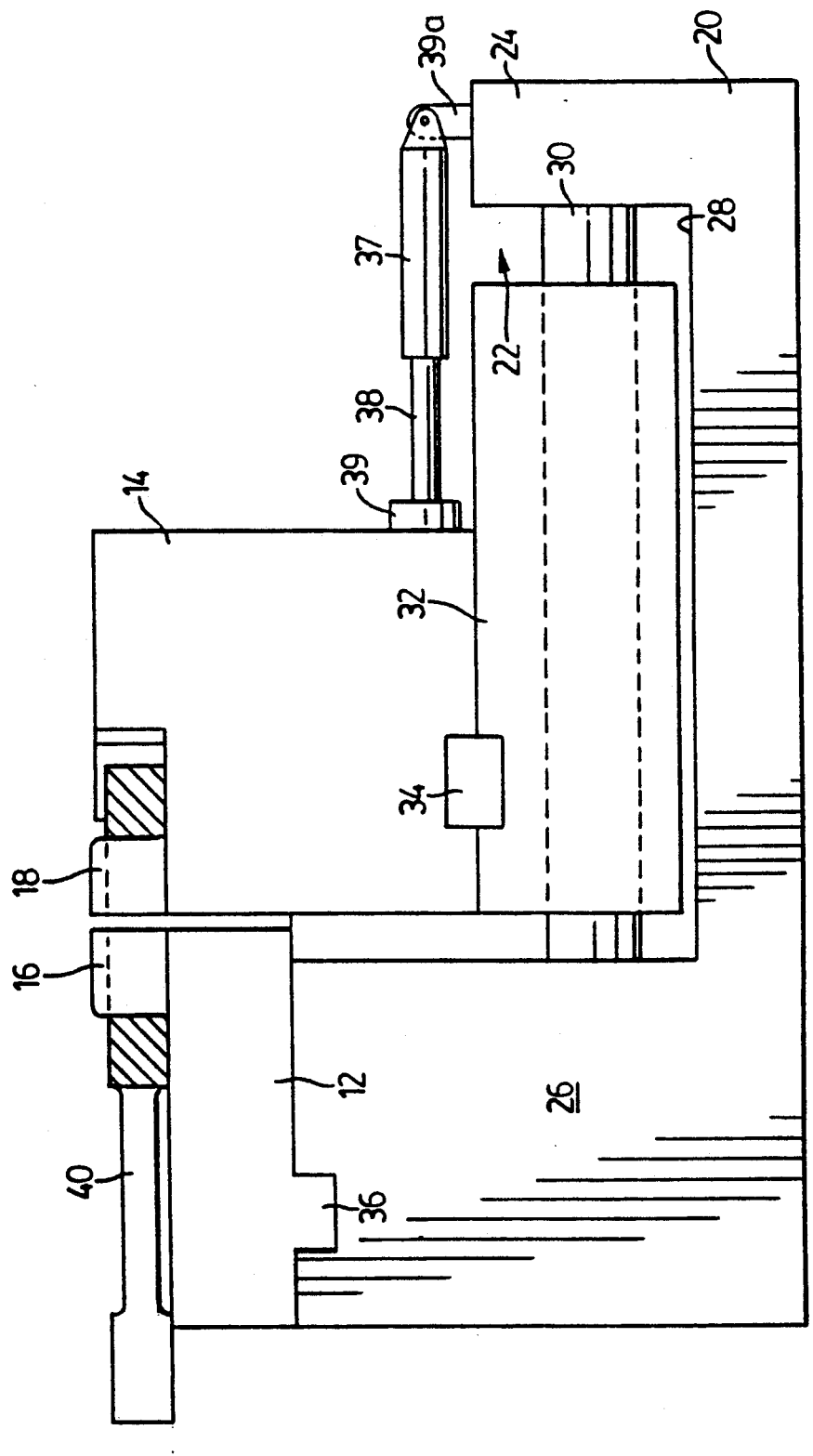
FIG. 2 is a side elevational view of the tool shown in FIG. 1.
Figure 3:
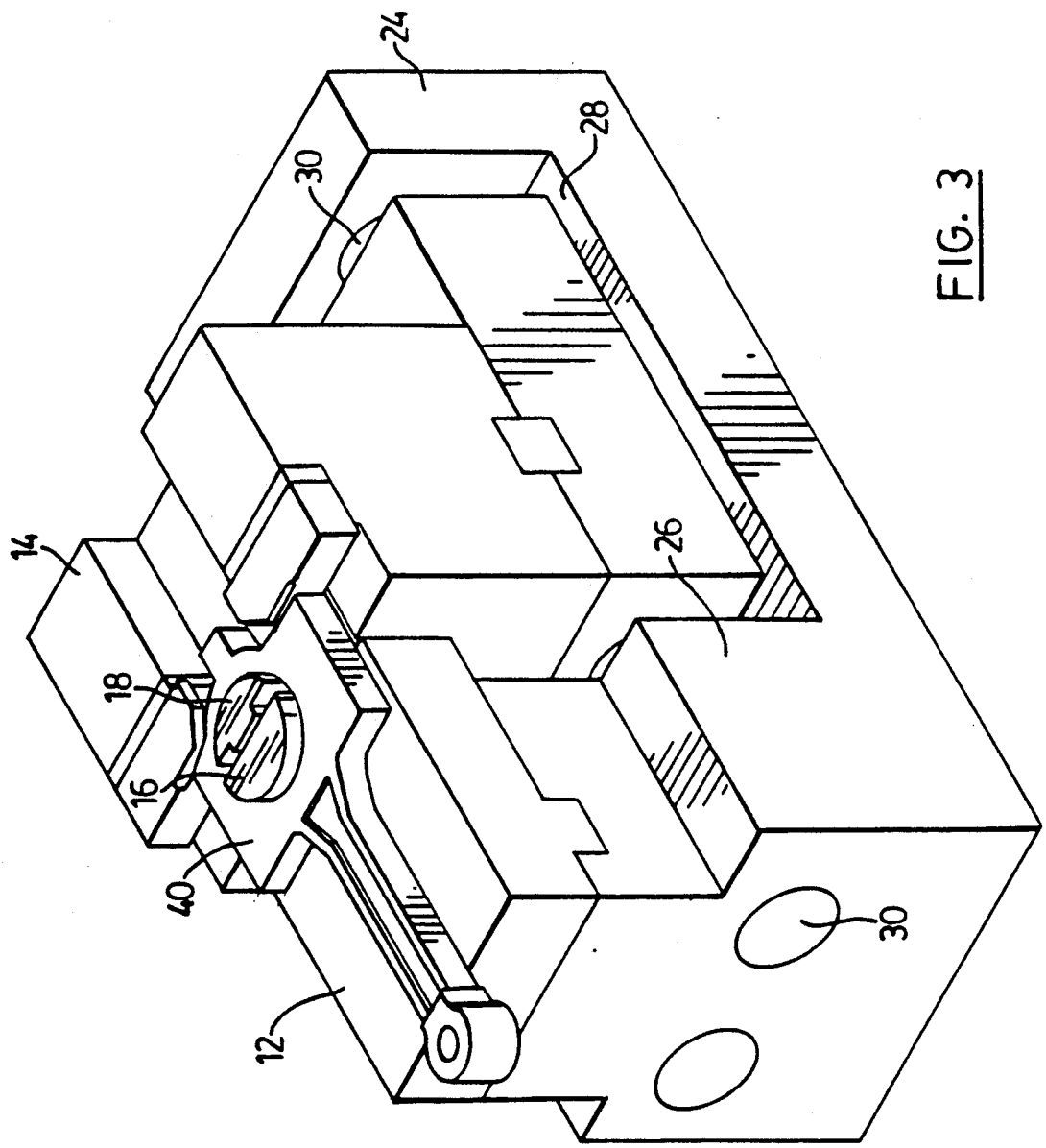
FIG. 3 is a perspective view of the tool illustrated in FIG. 1, complete with a guide member, and showing the positioning of a connecting rod.

Attention is now directed to FIGS. 2 and 3, which illustrate the two bodies 12 and 14 secured to a slide base 20. The slide base 20 defines a channel 22 between a first upstanding portion 24 and a second upstanding portion 26. The channel 22 further has a lower limit defined by a flat horizontal wall 28. Supported between the upstanding portion 24 and the upstanding portion 26 are two guide bars 30 (only one visible in FIG. 2).

Slidably mounted on the guide bars 30 is a slide platen 32 to which the body 14 is secured by a key 34. It will be seen in FIG. 2 that the body 12 is secured to the upstanding portion 26 by an integral key 36.

It will be particularly evident from FIG. 2 that the slide base 20 maintains the first body 12 stationary while allowing the second body 14 along with the slide platen 32 to reciprocate toward and away from the first body 12, between a first position (that illustrated in FIG. 2) when the two protuberances 16 and 18 combine together to define the cylindrical mandrel, and a second position (when the slide platen moves to its rightward limit) in which the protuberances 16 and 18 are separated from each other. Means are provided for forcefully moving the slide platen 32, and thus the body 14 and protuberance 18, in sliding motion along the guide bars 30. In FIG. 2, a suitable means for moving these components is represented schematically by a hydraulic cylinder 37 having a piston 38 secured to a flange 39 which is fastened to the body 14 by means not shown. The rightward end of the cylinder 37 is affixed to the portion 24 by way of a bracket 39a.

As well illustrated in FIGS. 2 and 3, a connecting rod 40 can be positioned such that the mandrel defined by the protuberances 16 and 18 enters the large bore in the big end of the connecting rod 40, whereupon movement of the body 14 away from the body 12 will cause tension cracking of the big end of the connecting rod 40. The method of making the tool illustrated in the figures comprises the following steps:

Firstly, the first body 12 and the second body 14 are cut from stock material having a particular grain direction, such that the respective protuberances 16 and 18, which together define a substantially cylindrical mandrel, have their axes substantially parallel to the grain direction. It has been found that, by aligning the mandrel axes with the grain direction, the life of the tool is substantially increased. It is believed that this improvement in the tool life comes about because the grains of the metal are subjected to a bending moment as opposed to a shear force. Metallic grains are better able to withstand a bending moment. Prior to incorporating this feature in the manufacturing process for the tool, the joint faces between the mandrels 16 and 18 and the bodies 12 and 14 had been continually subject to fractures.

Figure 4:
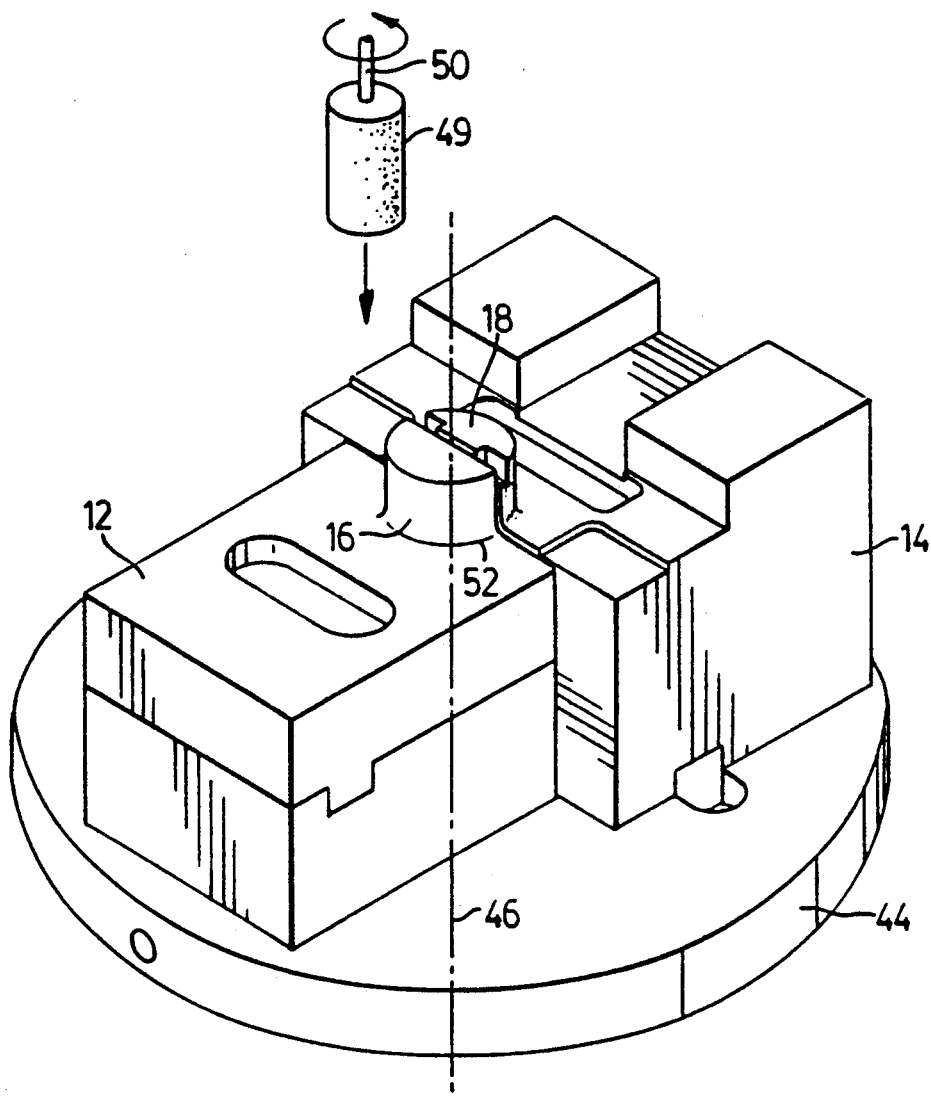
FIG. 4 is a somewhat schematic view of the tool of FIG. 1, showing a rotary table useful in the manufacturing process.
Figure 5:
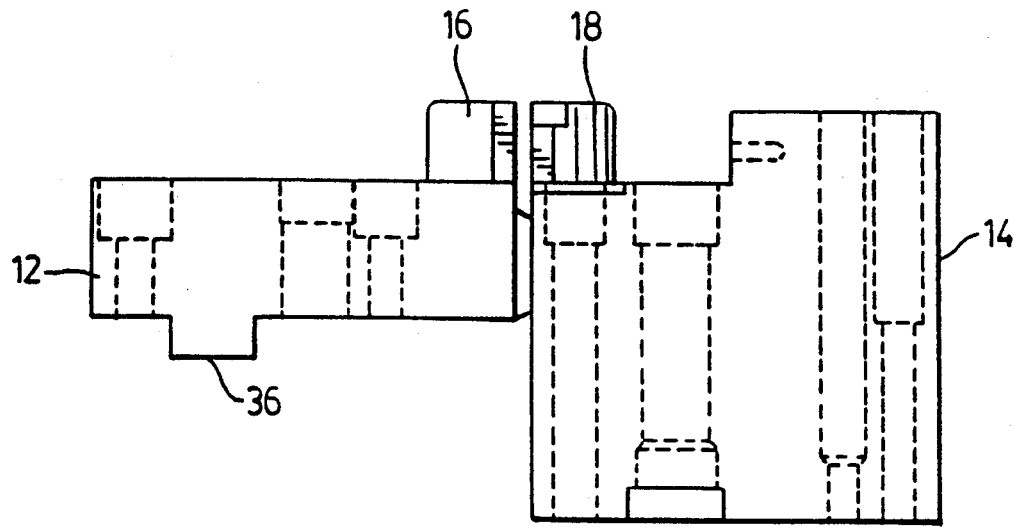
FIG. 5 is an elevational view of the tool of FIG. 1, primarily showing various bores for fasteners.
Figure 6:
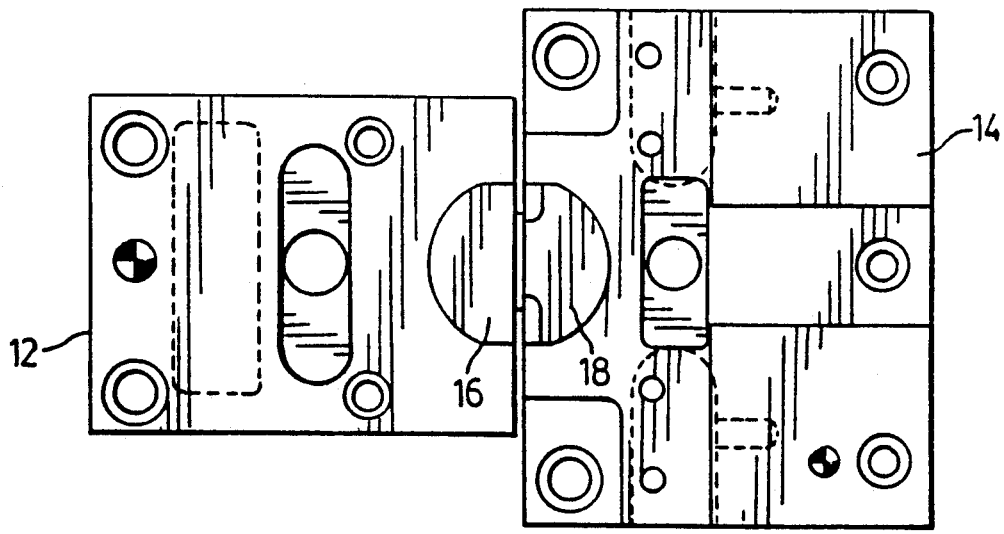
FIG. 6 is a plan view of the tool of FIG. 1.

Looking now at FIG. 4, the next step is to mount the bodies 12 and 14 to a rotary table shown schematically in FIG. 4 at the numeral 44. The rotary table 44 has an axis of rotation identified by the numeral 46, and the bodies 12 and 14 are secured to the table 44 in such a way that the axis of the mandrel defined by the protuberances 16 and 18 is coaxial with the axis of rotation 46 for the rotary table 44.

As further seen in FIG. 4, a grinding means, specifically a rotary grinding wheel 49 is provided to finish grind the outer surface of the mandrel defined by the protuberances 16 and 18, this being done while the rotary table 44 slowly rotates about its axis 46, with the grinding wheel 49 being lowered to come into contact with the outer surface of the mandrel, and rotating while its axis of rotation remains stationary. The axis of rotation of the grinding wheel 49 is defined by the stem 50.

Preferably, the protuberances 16 and 18 which define the mandrel are formed in such a way that the mandrel tapers inwardly in the downward direction, i.e. in the direction toward the bodies 12 and 14. The downward and inward taper (referred to as a negative taper) is one which produces a conical surface which has a smaller diameter at the lower end (where it connects to the bodies 12 and 14) than at the top. The force required to split or crack a connecting rod causes the split mandrel parts 16 and 18 to bend slightly before the connecting rod actually splits. The negative taper accommodates the bend and ensures that, at the moment of separation, the contact surfaces of the mandrel portions 16 and 18 (i.e. those parts receiving the compressive force) are substantially parallel with each other and to the bore of the connecting rod. The provision of the negative taper allows the tool to produce a cracked surface in the connecting rod which is perpendicular to the face of the connecting rod (rather than angled thereto), and which is satisfactorily flat (i.e. without excessive peaks and valleys).

It is also preferable that the grinding process is such as to leave a radiused fillet 52 where the mandrel adjoins the bodies 12 and 14. This will require the grinding wheel 49 to have a similar or complementary taper, and a rounded radius at the bottom.

After the grinding wheel 49 has completed its work, the bodies 12 and 14 are removed from the rotary table 44 and mounted to the slide base 20 and the slide platen 32 in the manner described earlier.

It will be understood that the manufacturing process described above could also include certain well-known procedures such as heat treating for the purpose of hardening.

It will be evident that each pair of bodies 12 and 14 of this split mandrel arrangement constitutes a matched set and must be used together when mounted on the fracturing unit.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A method of making a fracturing tool for connecting rods, comprising the steps:
    a) cutting a first body and a second body from material having a grain direction, each body having an integral, generally semi-cylindrical protuberance projecting therefrom and constituting one-half of a substantially cylindrical mandrel, the protuberances each including a flat, substantially diametral surface and being larger than the desired finished size, the cylindrical axis of each protuberance being substantially parallel with the grain direction of the material, the bodies being configured such that the protuberances can be placed together coaxially with said surfaces in contact to define said mandrel,
    b) mounting the bodies to a rotary table having an axis of rotation, such that the axis of the mandrel defined by the protuberances is coaxial with said axis of rotation,
    c) using a grinding means to finish grind the surface of the mandrel, while rotating said rotary table,
    d) removing the bodies from said rotary table, and mounting them such that one body is slidable toward and away from the other body in a direction perpendicular to the axis of the mandrel and perpendicular to both said surfaces, said one body being movable between a first position in which the protuberances are together and coaxial and a second position in which the protuberances are spaced apart, and
    e) providing means for forcefully urging the bodies together and apart.

2. The method claimed in claim 1, in which the protuberances are formed such that the mandrel which they define tapers slightly inwardly in the direction toward the bodies, and such that a radiused fillet is provided where the mandrel adjoins said bodies.

3. The method claimed in claim 1, in which step c) is accomplished using a rotary grinding wheel.

4. The method claimed in claim 2, in which step c) is accomplished using a rotary grinding wheel.

* * * * *